Feb. 23, 1971 J. BAUDE 3,566,244
POLYPHASE WAVE GENERATOR
Filed May 23, 1968 4 Sheets-Sheet 1

Inventor
John Baude
By Lee H Kaiser
Attorneys

| FLIP-FLOP | | | TRANSISTOR | | | | | |
|---|---|---|---|---|---|---|---|---|
| a | b | c | Q10 | Q11 | Q12 | Q13 | Q14 | Q15 |
| 0 | 0 | 1 | OFF | ON | OFF | ON | ON | OFF |
| 1 | 0 | 1 | ON | OFF | OFF | ON | ON | OFF |
| 1 | 0 | 0 | ON | OFF | OFF | ON | OFF | ON |
| 1 | 1 | 0 | ON | OFF | ON | OFF | OFF | ON |
| 0 | 1 | 0 | OFF | ON | ON | OFF | OFF | ON |
| 0 | 1 | 1 | OFF | ON | ON | OFF | ON | OFF |
| 0 | 0 | 1 | OFF | ON | OFF | ON | ON | OFF |

Fig. 4 (rows labeled $t_0, t_1, t_2, t_3, t_4$)

Inventor
John Baude
By Lee N. Kaiser
Attorney

United States Patent Office 3,566,244
Patented Feb. 23, 1971

3,566,244
POLYPHASE WAVE GENERATOR
John Baude, Milwaukee, Wis., assignor to Allis-Chalmers Manufacturing Company, Milwaukee, Wis.
Filed May 23, 1968, Ser. No. 731,580
Int. Cl. H02m 1/08, 1/12
U.S. Cl. 321—5
15 Claims

ABSTRACT OF THE DISCLOSURE

A static inverter for converting direct current into polyphase alternating current has a source of periodic signals, N bistable devices, and logic means including AND gates interconnecting the source and the bistable devices to switch them in a predetermined sequence of 2N permutations of stable states and inhibit them from transferring to permutation states which could cause lockup. The outputs of the bistable devices are coupled through power transistors to the primary windings of N output transformers in push-pull, and transformer secondary winding means derive N phase voltages displaced from one another by 360/N degrees of a waveform which results in the instantaneous voltages adding to zero and thus eliminates harmonic currents in the neutral. The inverter includes means for biasing the power transistors so they operate with low power dissipation near the region of saturation regardless of variations in supply voltage.

---

This invention relates to polyphase wave generators and, more particularly, to static inverters for converting direct current into polyphase alternating current.

The invention described herein was made in the performance of work under a NASA contract and is subject to the provisions of section 305 of the National Aeronautics and Space Act of 1958, Public Law 85–568 (72 Stat. 435; 42 U.S.C. 2457).

Static inverters for converting direct current into a polyphase alternating current supply voltage find wide application for operating electrical equipment in specialized installations such as spacecraft, for example, which may require a 400-cycle, three-phase alternating current power supply from a 21–35 volt direct current source, such as a fuel cell. Such polyphase wave generators also have utility in other applications such as driver systems for commercial standby power systems and for variable speed drives. Prior art polyphase wave generators were expensive, inefficient and complex. In addition it was difficult in many prior art polyphase wave generators to maintain a balanced output phase relationship when the operating frequency was changed. Another shortcoming of prior art static inverters was that the power dissipation in the power transistors was high when the supply voltage was high, and it was difficult to prevent the instantaneous power rating of transistors from being exceeded when such devices were used with inductive loads such as motors.

One type of prior art, three-phase wave generator is similar to a memory storage type ring oscillator, in which a plurality of signal amplifying devices are connected in a ring configuration so that each device controls the operation of the succeeding device. The output signals from such generators usually take the form of three square wave signals shifted 120° in phase with respect to each other. This type of prior art device was not wholly satisfactory, however, because it included R-C coupling circuits which introduced an inherent time delay and made frequency adjustment difficult, since an adjustment of the circuitry in one phase was reflected into the other phases. In addition, the time duration of the positive and negative portions of the output signals developed in any one of the phases was difficult to balance in the memory storage ring type generator. Prior art devices employing saturable reactors had much the same shortcomings.

Another shortcoming of prior art, polyphase wave generators was that their output signals included a high percentage of harmonics which resulted in high power losses in the output transformer and the load and did not readily permit their use in certain applications, such as an installation having the capability of operating a three-phase motor on two phases when one phase was interrupted.

It is an object of the invention to provide new and improved static polyphase wave generator.

A further object of the invention is to provide a polyphase wave generator which can be operated over a wide range of frequencies.

Another object of the invention is to provide a three-phase wave generator which can efficiently energize a load on two phases when one phase is interrupted.

Yet another object of the invention is to provide a polyphase wave generator for supplying a star connected load having a floating neutral in which circulating currents in the neutral caused by harmonic voltages are cancelled.

A further object of the invention is to provide a polyphase wave generator which may be operated over a wide range of direct current input voltages.

A still further object is to provide a solid state polyphase wave generating circuit having output transistors which are operated efficiently in saturation so that the power dissipation is low and they remain relatively cool and means for biasing said transistors so that they operate close to the region of saturation regardless of variations in power supply voltage.

Still another object is to provide a polyphase wave generator having means in one of the phases to insure that unbalance always occurs in the same direction and wherein the device will always start in the same condition.

Another object is to provide a static inverter having a plurality of bistable devices and logic means for switching the bistable devices in a predetermined sequence which utilizes less than all possible stable permutations of states and means for inhibiting said bistable devices from all simultaneously assuming permutation states wherein they would lock up.

Yet another object of the invention is to provide a polyphase wave generator wherein the correct phase relationship of the output is always maintained, regardless of frequency.

Another object is to provide a static inverter having bistable devices coupled by power transistors to output transformer means in push-pull and improved means for protecting the power transistors from reverse currents.

Still another object is to provide a static inverter having bistable devices coupled by power transistors to output transformer means in push-pull and improved means for reducing the magnitude of transient currents which tend to maintain the transistors conducting when they are switched off.

These and other objects of the invention will become more apparent from the detailed description taken with the accompanying drawings wherein:

Figure 1:
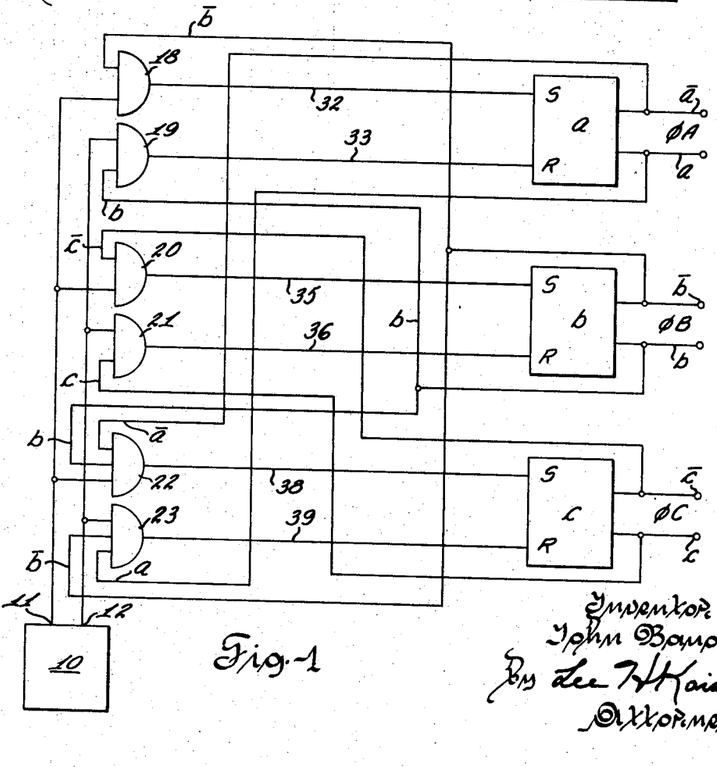
FIG. 1 is a block diagram illustrating the polyphase wave generator according to the invention.

Referring now to the drawings in greater detail, FIG. 1 shows the polyphase wave generator according to the invention to include a square wave generator, or oscillator 10 for providing periodically recurring signals alternately at output terminals 11 and 12, and three bistable devices $a$, $b$, and $c$, each of which is associated with one of the phases A, B and C. The bistable devices $a$, $b$, and $c$ may be flip-flop circuits and each is controlled by a pair of gating devices 18–19, 20–21 and 22–23, respectively. Each gating device is preferably an AND gate which, in accordance with conventional operation, furnishes an output voltage when all input circuits are energized. Each AND gate is coupled to receive one of the signals from the square wave generator 10 and, in addition, each is coupled to receive a feedback signal from the output of one of the bistable devices associated with the other two phases. In addition, the gating devices associated with one of the phases, such as gating devices 22 and 23 associated with phase C, are also coupled to receive a feedback signal from the bistable device of each of the other phases.

Figure 2:
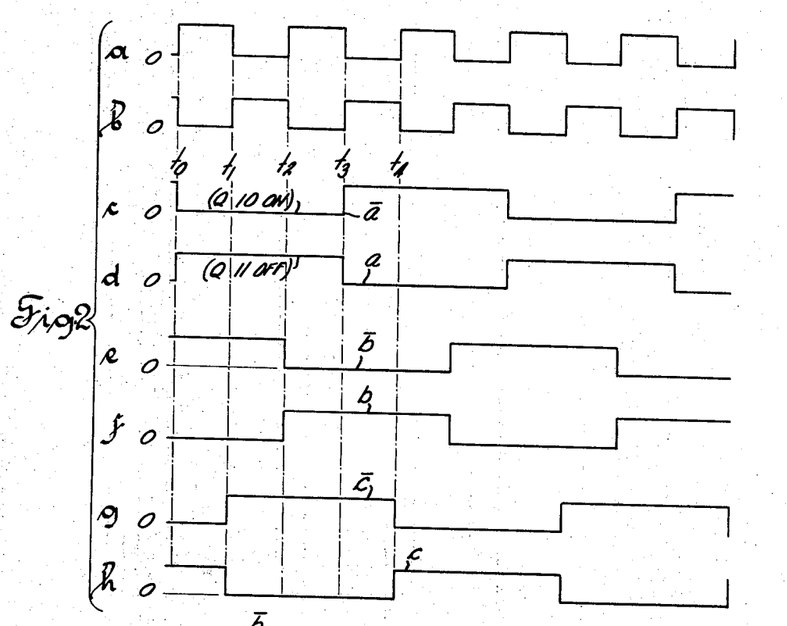
FIGS. 2a–2h are graphs illustrating the voltages appearing at various points in the generator shown in FIG. 1.

The square wave generator 10 is constructed and arranged to produce periodically recurring square waves which alternately occur at the outputs 11 and 12, as seen in FIGS. 2a and 2b. The bistable devices $a$, $b$ and $c$ are preferably flip-flop circuits, described in detail hereinafter, having pairs of output terminals designated $a$–$\bar{a}$ (not $a$), $b$–$\bar{b}$ and $c$–$\bar{c}$ respectively and being capable of maintaining either of two possible states. For example, bistable device $a$ may be considered as residing in the "1" state when the voltage on its output terminal $a$ is positive with respect to ground and zero voltage exists on output terminal $\bar{a}$, and as residing in the "0" state when the voltage on output terminal $\bar{a}$ is positive with respect to ground and zero voltage exists on output terminal $a$. The output terminals are labeled $\bar{a}$–$a$, $\bar{b}$–$b$, $\bar{c}$–$c$ where $\bar{a}$ ("not $a$"), $\bar{b}$ and $\bar{c}$ represent "0" outputs of bistable devices $a$, $b$ and $c$ respectively and $a$, $b$ and $c$ represent the "1" outputs. Each bistable device $a$, $b$ and $c$ has a pair of input terminals designated S (set) and R (reset), and a bistable device $a$, $b$ and $c$ in the "1" state is changed to the "0" state by applying a pulse to the R input terminal. Similarly, if a bistable device is in the "0" state, it is changed to the "1" state by applying a pulse to the S input terminal.

The outputs of AND gates 18, 19, 20, 21, 22 and 23 are coupled to the S and R input terminals of flip-flops $a$, $b$ and $c$ by conductors 32, 33, 35, 36, 38 and 39 respectively. In addition, the output terminals of the bistable devices $a$, $b$ and $c$ are connected to the gating devices by feedback conductors (given the same reference numerals as the bistable device output terminals to which they are connected) as follows.

| Flip-flop output: | Gating device |
|---|---|
| $\bar{b}$ | 18 and 23 |
| $b$ | 19 and 22 |
| $\bar{c}$ | 20 |
| $c$ | 21 |
| $\bar{a}$ | 22 |
| $a$ | 23 |

The three AND gates 18, 20 and 22 coupled to the S input terminals of the flip-flops $a$, $b$ and $c$ receive input pulses from terminal 11 of periodic signal source 10, and the three AND gates 19, 21 and 23 coupled to the R input terminals of the bistable devices receive input pulses from terminal 12. The AND gates 18–23 receiving inputs from both the periodic signal source 10 and the outputs of the bistable devices comprise logic means for switching the bistable devices $a$, $b$ and $c$ in a predetermined sequence. The bistable devices can periodically produce eight stable permutations of states, i.e., can assume eight distinct states discretely identified by voltage levels on the output terminals $\bar{a}$–$a$, $\bar{b}$–$b$ and $\bar{c}$–$c$, but only six of these states are used in the predetermined sequence as shown in the truth table of FIG. 4.

In accordance with the invention means are provided for inhibiting the bistable devices $a$, $b$ and $c$ from transferring to the states where they might lock up, namely the states 0, 0, 0 and 1, 1, 1 where they all simultaneously have the same state. In other words, the logic gating means of the invention limits the maximum permutation of the stable states of all bistable devices to a number equal to twice the number of desired inverter output phases, namely six.

Assume that bistable devices $a$ and $b$ are in the "0" state and device $c$ is in the "1" state at time $t_0$ when a positive pulse at terminal 11 of oscillator 10 appears as an input to AND gates 18, 20 and 22. Gate 18 will also receive an input from the $\bar{b}$ output terminal of flip-flop $b$ which is in the "0" state, and AND gate 18 will thus provide a pulse to the S terminal of flip-flop $a$ to change it to the "1" state as shown in FIGS. 2c and 2d. Gate 20 will receive no signal from terminal $\bar{c}$ because flip-flop $c$ is in the "1" state, and flip-flop $b$ will remain in the "0" state as shown in FIGS. 2e and 2f. Gate 22 will receive a signal from the output terminal $\bar{a}$ of flip-flop $a$ (which is in the "0" state) but will receive no signal from output terminal $b$, and thus flip-flop $c$ will remain in the "1" state at time $t_0$ as in FIGS. 2g and 2h.

Bistable devices $a$, $b$ and $c$ will remain in their stable states after time $t_0$ until time $t_1$ when oscillator 10 will generate a positive pulse at terminal 12 which will appear as inputs to AND gates 19, 21 and 23. Gate 19 will not receive a signal from terminal $b$ since flip-flop $b$ is in the "0" state, and thus flip-flop $a$ will remain in the "1" state as shown in FIGS. 2c and 2d. Gate 21 will receive a signal from terminal $c$ because flip-flop $c$ is in the "1" state, but flip-flop $b$ is already in the "0" state, as shown in FIGS. 2c and 2d, and the pulse from gate 21 to its R input terminal has no effect. Gate 23 will receive a signal from terminal $\bar{b}$ of flip-flop $b$ which is in the "0" state and it will also receive a signal from terminal $a$ of flip-flop $a$ which is in the "1" state and AND gate 23 thereby applies a pulse over conductor 39 to the S input terminal of flip-flop $c$ and changes it to the "0" state so that a positive voltage will appear at its output terminal $\bar{c}$ as shown in FIGS. 2g and 2h.

Bistable devices $a$, $b$ and $c$ will remain in their respective stable states after $t_1$ until at time $t_2$ when oscillator 10 again generates a positive pulse at terminal 11 which appears at the inputs of gates 18, 20 and 22. Gate 18 will also receive a signal from terminal $\bar{b}$ (because flip-flop $b$ in the "0" state) and supply a pulse over conductor 32 to the S terminal of flip-flop $a$, but such pulse will have no effect since flip-flop $a$ is already in the "1" state. Gate 20 will also receive a pulse from terminal $\bar{c}$ because flip-flop $c$ is in the "0" state, and gate 20 will supply a pulse over conductor 35 to the S input to change flip-flop $b$ from the "0" state to the "1" state. Gate 22 will receive no signals from terminals $\bar{a}$ and $b$ and thus will supply no pulse to flip-flop $c$.

At time $t_3$ oscillator 10 will generate a positive pulse at terminal 12 which will appear as an input to AND gates 19, 21 and 23. Gate 19 will also receive a signal from terminal $b$ and will supply a pulse over conductor 33 to the R input terminal which will change flip-flop $a$ from the "1" to the 0" state. Gate 21 will receive no signal from terminal $c$ and gate 23 will receive no signal from terminal $\bar{b}$, and thus gates 21 and 23 will provide no pulses to flip-flops $b$ and $c$.

Figure 4:
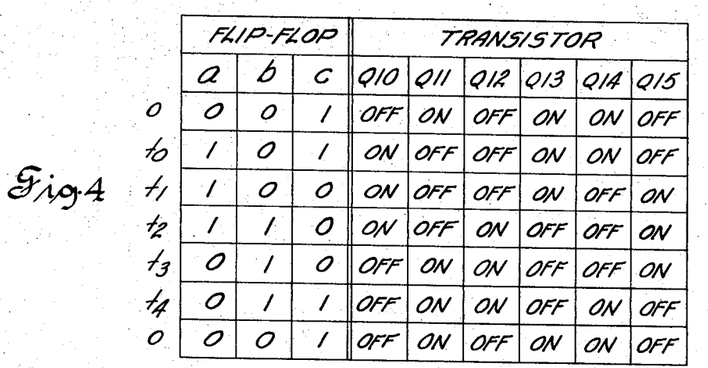
FIG. 4 is a truth table illustrating the states assumed by the bistable devices, and the transistors thereof, during a cycle of operation.

The states of the bistable devices a, b and c after oscillator 10 generates pulses at times $t_0$, $t_1$, $t_2$, $t_3$ and $t_4$ are shown in the truth table of FIG. 4. It will be noted that the signals shown in FIGS. 2c–2h appearing at the output terminals $\bar{a}$—a, $\bar{b}$—b, $\bar{c}$—c are of ⅓ the frequency of the pulses generated by oscillator 10 and are displaced from each other by 120 electrical degrees. It will also be noted from FIG. 4 that the bistable device a, b and c have six permutations of states and do not assume the permutations wherein all of the bistable devices are in the same state, namely, the permutations 0, 0, 0 and 1, 1, 1.

Figure 3A:
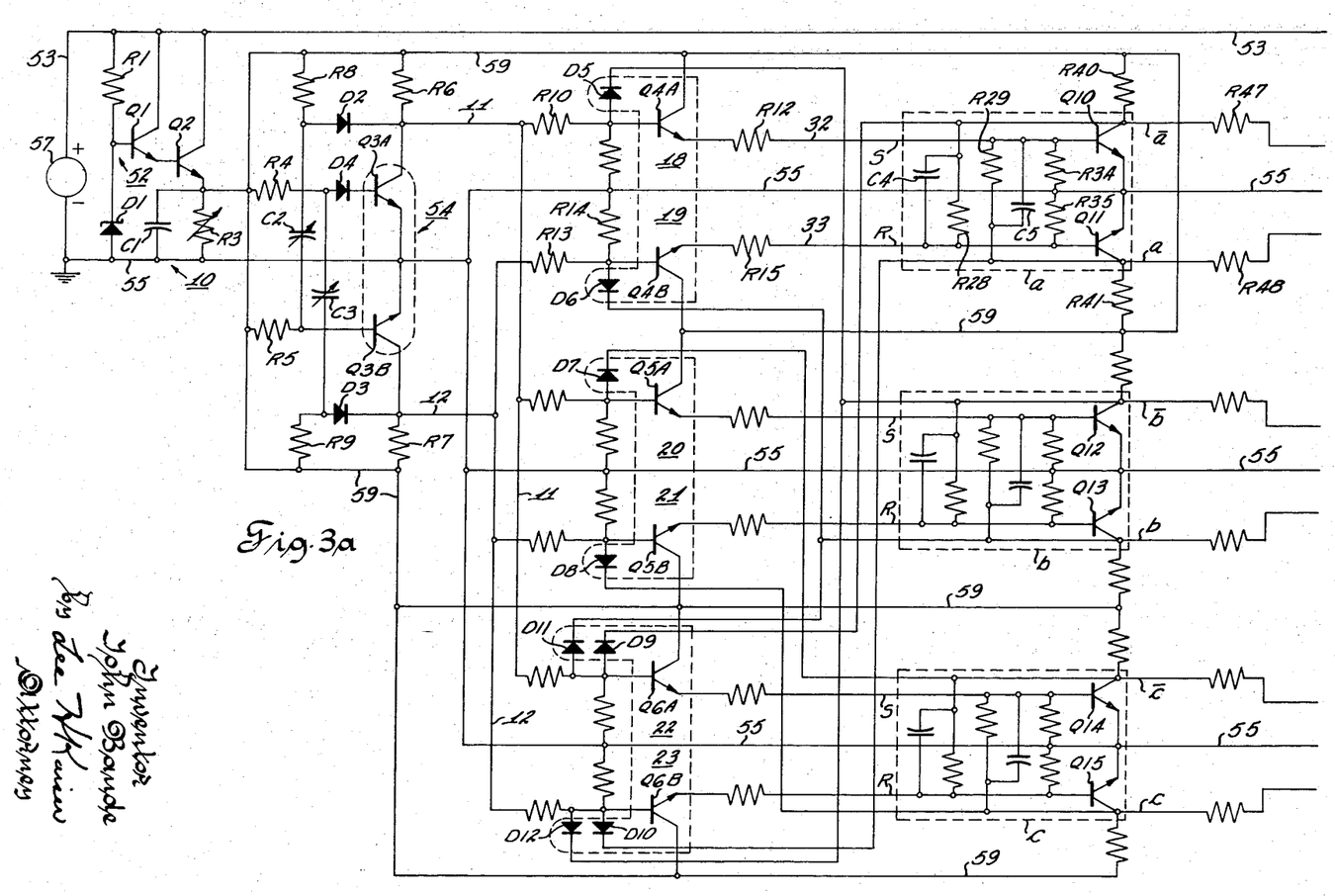
FIG. 3 is a circuit diagram schematically illustrating the preferred embodiment of the invention.
Figure 3B:
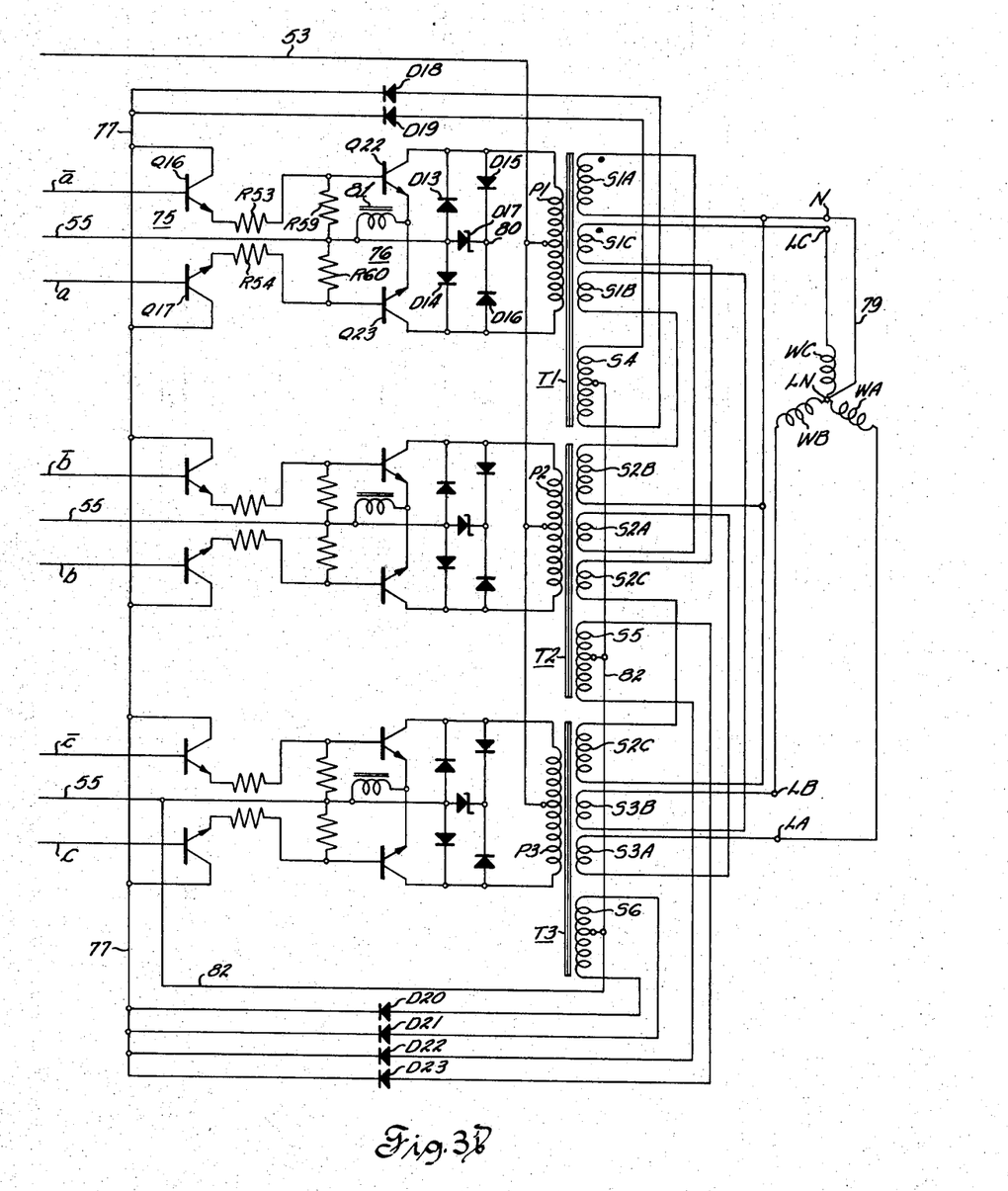

Reference is now made to FIG. 3 which schematically illustrates the preferred embodiment of the invention in greater detail. The oscillator 10 is shown to include a reference voltage circuit 52 and an astable, or free running multivibrator 54. The reference voltage circuit 52 is connected by conductors 53 and 55 to the positive and ground terminals, respectively, of a voltage source 57, which may be, for example, a fuel cell, which nominally has an output of 28 volts D.C., but whose output may vary between 21 and 35 volts. In order to provide a constant input voltage to the oscillator 54, the reference voltage circuit includes a resistor R1 and a Zener diode D1 connected in series between the positive conductor 53 and the ground bus 55. The reference voltage circuit also includes a pair of transistors Q1 and Q2 wherein the base of Q1 is connected to the junction of the Zener diode D1 and resistor R1 and the emitter of Q1 is connected to the base of Q2. The breakdown potential of the Zener diode D1 is less than the lowest expected output voltage from the fuel cell 57 so that a preselected voltage will appear on the base of transistor Q1 regardless of variations in the fuel cell output voltage. The collectors of transistors Q1 and Q2 are connected to the positive conductor 53, and the emitter of Q2 is connected to the ground bus 55 through the parallel combination of a capacitor C1 and an adjustable resistor R3.

The astable multivibrator 54 includes a pair of generally symmetrically connected transistors Q3A and Q3B, whose bases are respectively connected to the possitive bus 59 through resistors R4 and R5. The emitters of each of the transistors Q3A and Q3B are connected to the ground bus 55 and their collectors are respectively connected to the positive bus 59 through resistors R6 and R7. In addition, a first cross-coupling circuit, consisting of a diode D2, capacitor C2 and resistor R8, couples the collector of transistor Q3A to the base of transistor Q3B and a second cross-coupling circuit consisting of a diode D3, capacitor C3 and a resistor R9 couples the collector of transistor Q3B to the base of transistor Q3A. As those skilled in the art will appreciate, the cross-coupling circuits prevent the transistors Q3A and Q4A from conducting simultaneously, so that they are forced to conduct alternately and generate square waves at terminals 11 and 12, as illustrated in FIGS. 2a and 2b. The frequency of the signals at terminals 11 and 12 can be regulated by adjusting capacitors C2 and C3. The diodes D3 and D4 function to rapidly discharge capacitors C2 and C3 when their respective transistors Q3A and Q3B are switched, so that the switching occurs rapidly, a rounded leading edge on the generated square waves is eliminated, and the signals at terminals 11 and 12 will assume a relatively square shape.

The gating circuits 18, 19, 20, 21, 22 and 23 are substantially identical, and the bistable circuits a, b and c are also substantially identical. For the sake of brevity only the gating circuits 18 and 19 and the bistable circuit a associated therewith will be discussed in detail. The AND gate 18 includes a transistor Q4A whose base is connected to terminal 11 of oscillator 54 through resistor R10 and to the ground bus 55 through resistor R11. The collector of transistor Q4A is connected to the positive bus 59 and its emitter is connected through resistor R12 to the base of a transistor Q10 (which may be considered the S input terminal) of bistable circuit a. In a similar manner, the gating circuit 19 includes a transistor Q4B, whose base is connected to the oscillator terminal 12 by resistor R13 and to the ground bus 55 by resistor R14, while its collector is connected to positive bus 59 and its emitter is connected through resistor R15 to the base of a transistor Q11 (which may be considered the R input terminal) of bistable circuit a.

The bistable circuit a comprises a flip-flop circuit which possesses two conditions of stable equilibrium, namely, a "1" state when transistor Q10 is conducting and Q11 is cut off and a "0" state when transistor Q10 is cut off and Q11 is conducting. The emitter of transistor Q10 is connected to the ground bus 55 and its collector is connected through resistor R40 to the positive bus 59. In a similar manner, the emitter of transistor Q11 is connected to the ground bus 55 and its collector is connected to the positive bus 59 through resistor R41. In addition, the parallel combination of a capacitor C4 and resistor R28 connects the collector of transistor Q10 to the base of transistor Q11 and a similar circuit, consisting of capacitor C5 and resistor R29 interconnects the collector of transistor Q11 and the base of transistor Q10. The resistors R34 and R35 connect the bases of transistor Q10 and Q11, respectively, to the ground bus 55.

Transistors Q10 and Q11 conduct alternately and each remains in its conductive or nonconductive state until the nonconductive transistor receives a base signal, whereupon the initially cut off transistor turns on to turn the previously conducting transistor off. When transistor Q10 is conducting and bistable device a is in the "1" state, transistor Q10 will couple the bistable device output terminal $\bar{a}$ to the ground bus 55 so that substantially ground potential will appear at said output terminal $\bar{a}$, while the nonconductive transistor Q11 will isolate the terminal a from ground bus 55 so that terminal a will be coupled to the positive bus 59 and a positive output potential will exist at the output terminal a. On the other hand, in the "0" state of bistable device a when the transistors Q10 and Q11 are switched so that transistor Q11 is conductive and Q10 is nonconductive, a substantially zero potential will appear at terminal a and a positive potential at terminal $\bar{a}$. Thus in FIGS. 2c, 2d, 2e, 2f, 2g and 2h, which respectively show the potential at the output terminals $\bar{a}$, a, $\bar{b}$, b, $\bar{c}$ and c, a positive potential indicates that its associated transistor is nonconductive, or off, and a zero potential indicates that said transistor is conductive.

The transistors Q4A and Q4B of AND gates 18 and 19 are controlled by input signals received from the terminals 11 and 12 and feedback signals from output terminals $\bar{b}$ and b respectively of flip-flop circuit b. The gating circuits 18 and 19 function as AND logic circuits to provide a gating signal when it receives both an oscillator pulse and a feedback signal as inputs. The nonreactive feedback circuits for gating circuits 18 and 19, respectively, comprise the diode D5 and the diode D6 and it will be noted that such feedback circuits take the place of RC time delays which are present in coupling circuits of inverters of the ring counter type.

More specifically, diode D5 connects the base of transistor Q4A to terminal $\bar{b}$ and the collector of transistor Q12 of flip-flop b, and diode D6 connects the base of transistor Q4B to terminal b and the collector of transistor Q13. In a similar manner, the base of transistor Q5A of gating circuit 20 is connected by diode D7 to terminal $\bar{c}$ and the collector of transistor Q14 of flip-flop c; the base of transistor Q5B of gating circuit 21 is connected by diode D8 to terminal c and the collector of transistor Q15; diode D9 connects the base of transistor Q6A of gating circuit 22 to the collector of transistor Q10 of flip-flop a; and diode D10 connects the base of transistor Q6B of gating circuit 23 to terminal a and the collector of transistor Q11. In addition, the bases of transistors Q6A and Q6B are respectively coupled to receive a second feedback signal through diode D11 from terminal $b$ and diode D12 from terminal $\bar{b}$. As will become more apparent hereinafter, the latter connections insure that any unbalance will be in the same direction and that the circuit will always start in the same condition. One feedback circuit to each transistor Q6A and Q6B is directly coupled, for example, the coupling to AND gate 22 through diode D9 from terminal $\bar{a}$ and the other feedback is re-entrantly coupled, or inversely coupled relative to the direct coupled input, for example, input to AND gate 22 through diode D11 from terminal $b$, and this cross-coupling inhibits the bistable devices $a$, $b$ and $c$ from assuming the permutation states wherein they all simultaneously have the same state, i.e., 1, 1, 1 or 0, 0, 0, and thus prevents the bistable devices from locking in. Even if bistable devices $a$, $b$ and $c$ are all in the same state when power is initially applied, such cross-coupling causes this state to be unstable and switches the bistable device to one of the six stable states shown in FIG. 4. Another way of stating this is that such cross-coupling limits the maximum permutations of stable states of said bistable devices to a number equal to twice the number of output phases from the inverter.

Assume that prior to time $t_0$ the device shown in FIG. 3 is in the conductive condition shown in FIGS. 2c–2h, wherein bistable device $a$ is in a "0" state and transistor Q10 is off so that a positive potential exists on terminal $\bar{a}$; transistor Q11 is on, so that a zero potential exists at terminal $a$; bistable device $b$ is in a "0" state and transistor Q12 is off so that a positive potential exists at terminal $\bar{b}$; transistor Q13 is on, so that a zero potential exists on terminal $b$; bistable device $c$ is in a "1" state and transistor Q14 is on, so that a zero potential exists at terminal $\bar{c}$; and transistor Q15 is off, so that a positive potential exists at terminal $c$. At time $t_0$ a positive pulse will appear at terminal 11 which is coupled to the base of each of the transistors Q4A, Q5A and Q6A. In addition, because transistor Q12 is off, a positive voltage will appear on terminal $\bar{b}$ which is blocked by diode D5 so that the base of transistor Q4A will receive the oscillator output signal on terminal 11 and be rendered conductive to pass a gating signal to the S input terminal of flip-flop $a$ and to the base of transistor Q10, which turns on to turn transistor Q11 off and thus change flip-flop $a$ from the "0" state to the "1" state. When transistor Q10 turns on, it will connect terminal $\bar{a}$ to the ground bus 55, so that a substantially zero potential will appear on said terminal, while a positive voltage will appear on terminal $a$ when transistor Q11 turns off, as seen in FIGS. 2c and 2d.

Transistor Q5A will not be rendered conductive by the signal at terminal 11, however, because its base is connected by diode D7 to the collector of transistor Q14, which is conducting, so that the signal from terminal 11 will be passed to ground through diode D7 and the collector-emitter circuit of Q14 and transistor Q5A will remain nonconductive. As a result, transistor Q12 of flip-flop $b$ will remain nonconductive so that a positive potential will continue to exist at terminal $\bar{b}$ and transistor Q13 will remain conductive so that a substantially zero potential will exist at terminal $b$.

Because transistor Q14 of flip-flop $c$ is already conductive, its state will not be changed even though the oscillator terminal 11 is connected to the base of transistor Q6A since the oscillator output signal is shunted to ground through diode D11 and the collector-emitter circuit of the conductive transistor Q13. Thus flip-flop $c$ does not change its state and a substantially zero potential will continue to exist at output terminal $\bar{c}$ and transistor Q15 will remain off so that a positive potential will continue to appear at terminal $c$ of bistable device $c$.

At time $t_1$ the oscillator output signal at terminal 12 is coupled to transistors Q4B, Q5B and Q6B. The output pulse from transistor Q4B will not switch transistor Q11 because transistor Q13 is conductive and, hence, the pulse will be shunted to ground through diode D6 and the collector-emitter circuit of transistor Q13. As a result transistor Q11 will remain off and transistor Q10 will remain on, so that flip-flop $a$ will not change states and a positive potential will continue at terminal $a$ and a substantial zero potential will continue at terminal $\bar{a}$. Because transistor Q13 is already conductive, a signal on the base of transistor Q5B will not affect the conductive state of transistors Q12 or Q13, so that positive potential will continue to appear at terminal $\bar{b}$ and a substantially zero potential will continue to appear at terminal $b$. Because transistors Q12 and Q11 are both cut off to which the base of transistor Q6B is connected through diode D12 and diode D10 respectively, transistor Q6B will be rendered conductive at time $t_1$ by the input signal at terminal 12 to provide a signal to transistor Q15, which turns on to thereby turn transistor Q14 off and change flip-flop $c$ from the "1" to the "0" state. As a result, a positive potential will appear at terminal $\bar{c}$ and a substantially zero potential will appear at terminal $c$ at time $t_1$, as seen in FIGS. 2g and 2h.

At time $t_2$ an oscillator output signal will again appear at terminal 11 and is coupled to the bases of transistors Q4A, Q5A and Q6A, but this will not affect any change in transistor Q10 of flip-flop $a$ which is already conducting, or transistor Q14 of flip-flop $c$ because the signal is shunted to ground through the collector-emitter circuit of transistor Q10 and diode D9. As a result, there will be no change in the output signals at terminals $\bar{a}$, $a$, $\bar{c}$ and $c$ at time $t_2$ as shown in FIGS. 2c, 2d, 2g and 2h. Transistor Q5A, however, also receives a positive feedback signal from the collector of the nonconducting transistor Q14 which is blocked by diode D7 so that transistor Q12 will be turned on by the pulse from gate 20 and transistor Q13 turned off, to change flip-flop $b$ from the "0" state to the "1" state and provide a positive output signal at terminal $b$, and a substantially zero output signal at terminal $\bar{b}$ as seen in FIGS. 2e and 2f.

The states of the transistors Q10, Q11, Q12, Q13, Q14, and Q15 after pulses at times $t_0$, $t_1$, $t_2$, $t_3$, and $t_4$ are shown in FIG. 4.

In this manner, the bistable circuits $a$, $b$ and $c$ will be switched in a predetermined sequence of six permutation states to provide alternate, recurring voltage pulses which have a 120° phase relationship with respect to each other.

The preferred embodiment of the invention includes three output transformers T1, T2 and T3 respectively having primary windings P1, P2 and P3 with midtaps connected to the conductor 53 from the direct current source and their ends coupled respectively to the output terminals of the bistable devices $a$, $b$ and $c$. The three phases of the inverter are substantially identical and only phase A will be discussed which includes bistable device $a$ having output terminals $\bar{a}$ and $a$ coupled through a preamplifier stage 75 and a power transistor driver stage 76 to the ends of primary winding P1 in a push-pull arrangement.

The preamplifier stage 75 includes a pair of transistors Q16 and Q17 whose bases are respectively connected to terminals $\bar{a}$ and $a$ of flip-flop $a$ through resistors R47 and R48, and the collectors of both transistors Q16 and Q17 are connected to a base bias conductor 77 whose purpose will be discussed hereinbelow. The emitters of transistors Q16 and Q17 are respectively connected through resistors R53 and R54 to the bases of power transistors Q22 and Q23, of the driver stage 76. The ends of primary windings P1 are respectively connected to the collectors of power transistors Q22 and Q23, and the emitters of transistors Q22 and Q23 of driver stage 76 are connected to the ground bus 55, and resistors R59 and R60 respectively interconnect their bases to said ground bus.

Diodes D13 and D14 are connected in parallel with the emitter-collector circuits of transistors Q22 and Q23 respectively, and are poled in the opposite direction to the normal direction of current flow therethrough. In addition, a second pair of diodes D15 and D16 are connected between the collectors of transistors Q22 and Q23, respectively, and a common point 80 which is connected by Zener diode D17 to the ground bus 55. The purpose of these connections will be discussed after the operation of the device is first considered.

Transformer T1 has a main secondary winding S1A connected in series with secondary booster, or compensating windings S2A of transformer T2 and S3A of transformer T3, with the series combination in circuit between a transformer neutral terminal N and a load terminal LA and providing a single phase output from the inverter. Similarly, transformer T2 has a main secondary winding S2B, which is connected in series with secondary booster winding S1B of transformer T1 and S3B of transformer T3 to provide the inverter phase B output, and transformer T3 has a main secondary winding S3C which is in series with booster windings S1C of transformer T1 and S2C of transformer T2 to provide the phase C output from the inverter. Main secondary winding S1A has twice the number of turns as each of the secondary booster windings S2A and S3A and is reversed in polarity from both secondary booster windings, as indicated by the dots shown in FIG. 3b at the ends of the windings.

The three inverter output phases (each of which comprises a main secondary winding in series with two booster secondary windings reversed in polarity relative thereto) are connected in Y at the neutral point N. The static inverter has three output terminals LA, LB and LC which are shown connected to an inductive load having three windings WA, WB and WC, which may be the motor windings of a fan, connected in Y at a floating neutral point LN with a fourth conductor 79 connecting the load neutral point LN to the neutral point N of the inverter output phases.

Each of the transformers T1, T2 and T3 also includes a center tapped bias deriving secondary winding S4, S5 and S6, respectively, whose opposite ends are connected to base bias conductor 77 through diodes D18, D19, D20, D21, D22 and D23, and whose center taps are connected to the ground bus 59 by conductor 82.

It will be recalled that a positive voltage will appear alternately on output terminals $\bar{a}$ and $a$ of bistable device $a$ depending upon whether it is in the "1" state or the "0" state, i.e., depending on which of the transistors Q10 or Q11 is conductive. Should a positive voltage appear at terminal $\bar{a}$, for example, it will render preamplifier transistor Q16 conductive to pass a base current to power transistor Q22, which in turn, is rendered conductive to pass current to the upper half of primary winding P1 of transformer T1. This induces a voltage in each of the secondary windings S1A, S1B, S1C and S4.

When flip-flop transistor Q10 turns on and transistor Q11 turns off in the manner described hereinabove, a positive voltage will appear at terminal $a$ and substantially zero voltage will appear on terminal $\bar{a}$, so that preamplifier transistor Q17 will be turned on, and transistor Q16 will turn off. This will provide a signal to the base of power transistor Q23 to turn it on and thus energize the lower half of transformer primary winding P1, thereby inducing voltage in each of the secondary windings S1A, S1B, S1C and S4.

In the absence of the compensating windings S2A and S3A, connected in series with winding S1A; S1B and S3B connected in series with winding S2B; and S1C and S2C connected in series with winding S3C; each of the individual inverter output phase voltages would have a substantially rectangular shape. As those skilled in the art will appreciate, in a three-phase system consisting of square wave individual phase voltages, the instantaneous square wave voltages do not add up to zero and a large third harmonic voltage, which may be 50% of the phase-to-phase voltage, exists tending to cause circulating current in the fourth wire 79 which results in high power dissipation in the output transformer and the load. The compensating windings such as S2A and S3A perform the function of supplementing each of the square wave voltages induced in a main secondary winding such as S1A by a voltage equal to one-half of the phase voltage of each of the other two phases, to produce the stepped wave forms shown in FIGS. 5a–5c, and in which there is zero third harmonic voltage existing tending to circulate harmonic currents in the fourth wire.

Figure 6:
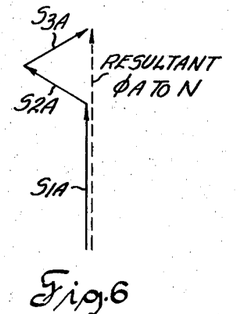
FIG. 6 is a vector diagram of the voltages which are added to provide a single phase output from the inverter of the invention.
Figure 7:
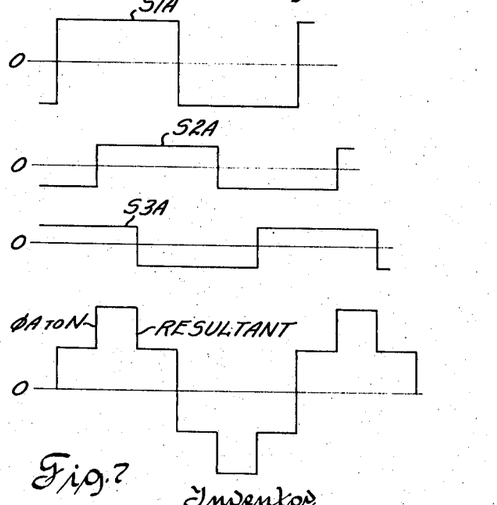
FIG. 7 is a schematic showing of how the voltages (shown vectorially in FIG. 6) are added to derive the phase voltage stepped waveforms which simultaneously add to zero and eliminate circulating current in the neutral.

FIG. 6 is a vector diagram showing how the voltage induced in main secondary winding S1A adds to the voltage induced in winding S2A (which has half the number of turns and is reversed in polarity from winding S1A and energized from phase B voltage applied to primary winding P2 which lags the phase A voltage by 120°) and to the voltage induced in winding S3A (which has ½ the number of turns and is reversed in polarity from winding S1A and energized from phase C voltage applied to primary winding P3 which leads the phase A voltage by 120°) to produce the phase to neutral voltage appearing between terminal LA and the neutral N. FIG. 7 shows how these voltages, so differing in amplitude and phase, add graphically to produce the stepped resultant phase A to neutral voltage appearing between output terminal LA and the neutral N.

Figure 5:
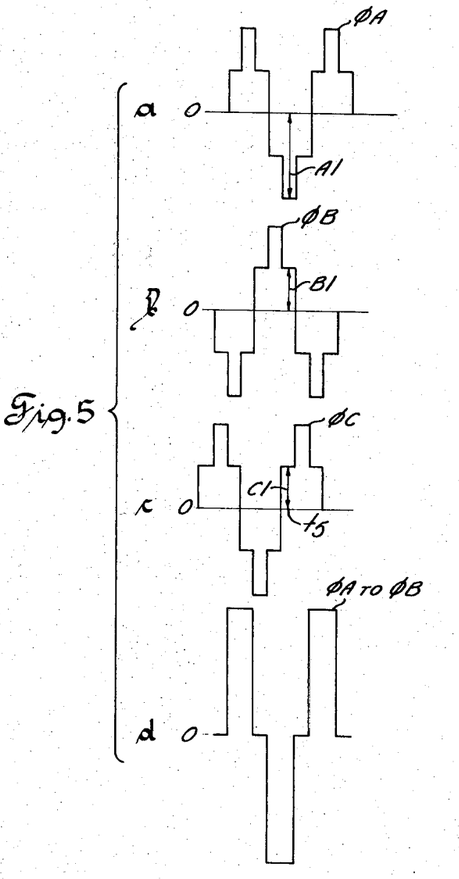
FIGS. 5a–5d are graphs illustrating the output voltages in the wave generator shown in FIG. 3.

FIGS. 5a, 5b and 5c illustrate the stepped phase to neutral voltage for inverter output phases A, B and C respectively appearing at output terminals LA, LB and LC respectively, and FIG. 5d illustrates the phase-to-phase voltage existing between terminals LA and LB. These three phase-to-neutral voltages add to zero at any instant, and this can be demonstrated graphically by summing the positive and negative values of the three waves at any instant of time, for example, instantaneous voltages A1, B1 and C1 at time $t_5$ shown in FIG. 5. The 120 degrees separation of the phase-to-neutral output voltages results in cancellation of all harmonic voltages and in the elimination of all harmonic current flow in the fourth wire 79, thereby eliminating the high losses in the load and in the output transformer which accompanied flow of harmonic currents in the fourth wire of known static inverters supplying Y-connected a load with a floating neutral.

The disclosed static inverter operates a Y-connected load, such as the motor of a fan, even when one phase is interrupted. The current flows in the same direction as before when one phase to the load is open, the magnitude of the phase currents increases by a factor of 3 to 2 as shown in FIG. 5d, and the phase-to-neutral voltages stay the same in the two remaining legs.

The forward biased diodes D13 and D14 provide a path for reverse current flow which occurs as a result of the inductive load at the instant the transistors Q22 and Q23 are switched. In inverter circuits that energize a power factor load, the current is not in phase with the voltage, and reverse current cyclically flows through the power transistors driving the output transformer. Sufficiently high reverse current through a transistor may cause thermal or secondary breakdown of the transistor. The diodes D13 and D14 are connected across the emitter-collector circuits of the power transistors Q22 and Q23 and are poled in the opposite direction to the normal flow of current through these emitter-collector circuits. Diodes D15 and D16 provide an auxiliary, full wave rectifier power source which continuously forward biases diodes D13 and D14 a predetermined amount determined by the drop across Zener diode D17 so that the portion of the reverse currents that flows through the diodes is greatly increased. Therefore the reverse current flowing through the emitter-collector circuits of the transistors Q22 and Q23 is relatively decreased for a particular reverse current.

The power dissipation in the output transistors such as Q22 and Q23 being a minimum depends upon their operation as close to saturation as possible, or just in saturation. The collectors of power transistors Q22 and Q23 receive direct current over conductor 53 from a fuel cell source which may vary from 21 to 35 volts. In order to obtain maximum efficiency, the base of power transistors Q22 and Q23 must be driven with just sufficient current to operate near saturation, and so that it is just in saturation when it turns on. Driving the power transistors Q22 and Q23 too far into saturation results in high power dissipation. The base bias deriving secondary windings S4, S5 and S6 feed back current through diodes D18–D23 and thus provide a low source of power for the preamplifier transistors Q16 and Q17 over the conductor 77 which is coupled to the collectors of transistors Q16 and Q17. Such base bias power source varies the base drive on the power transistors Q22 and Q23 as a function of changes in the direct current supply voltage and load current.

As the voltage of the direct current source increases, the voltage on the collectors of power transistors Q22 and Q23 increases, and the power transistor collector current and load current increases. If it were not for the bias deriving windings S4, S5 and S6, the power transistors Q22 and Q23 would operate in the nonsaturated region and the voltage drop across the power transistors and the power dissipation therein would greatly increase. Inasmuch as the bias deriving windings S4, S5 and S6 are on the secondaries of transformers T1, T2 and T3, increase in voltage of the direct current power source results in increase in the voltages induced in windings S4, S5 and S6, greater current feedback through diodes D18 to D23 to the collectors of preamplifier transistors Q16 and Q17, and increased base drive current to the power transistors Q22 and Q23 which keeps them in the region of saturation regardless of variations in power supply voltage or in load current.

Inductance 81 connected between the emitters of power transistor Q22 and the ground lead 55 reduces the magnitude of transient currents which tend to maintain a power transistor conducting at the time it is switched off by the bistable device $a$ changing states. I have found that a transient current tends to circulate through the transformer primary winding P1 and the emitter-collector circuits of both power transistors Q22 and Q23 when both are conducting at the moment they are changing states, and the reverse bias created by the inductance 81 at the instant of switching is in a direction to cut off the transistor Q22 or Q23 that is being switched to the nonconductive state.

While only a single embodiment of the invention has been shown and described, and while the invention has been discussed in relation to a particular direct current source and particular load, it is not intended to be limited thereby.

The embodiments of the invention in which an exclusive property or privilege is claimed are defined as follows:

1. In a static inverter for converting direct current into polyphase alternating current, the combination of:
a source of direct current,
output transformer means having N primary windings with midtaps connected to said direct current source,
N bistable devices each having a pair of output terminals,
means including a pair of power transistors for coupling said output terminals of each of said bistable devices to one of said primary windings in push-pull,
a source of periodic signals,
logic control means interposed between said bistable devices and being responsive to said periodic signals for switching said bistable devices in a predetermined sequence and including means for inhibiting said bistable devices for all assuming the same state simultaneously, and
means including a bias deriving secondary winding on said output transformer means for biasing said power transistors so that they operate near saturation regardless of variations of power supply voltage, whereby the amount of bias on said power transistors varies as a function of the current through said output transformer means.

2. In a static inverter in accordance with claim 1 wherein said output terminals of said bistable device are coupled to the bases of said power transistors and said means for biasing varies the base drive on said power transistors.

3. In a static inverter in accordance with claim 1 and including first and second diodes connected to bypass reverse currents past said first and second power transistors respectively and rectifying means connected across said primary winding for continuously forward biasing said first and second diodes.

4. In a static inverter in accordance with claim 2 wherein said emitters of said power transistors are coupled to ground and including inductance means between the emitters of each power transistor and ground for reducing the magnitude of transient currents tending to maintain said power transistor conducting when it is switched off.

5. In a static inverter,
a source of periodic signals providing first and second signals alternatively,
N bistable devices having first and second input terminals and switching between states in response to signals appearing thereon and also having first and second output terminals and providing voltage on said first and second output terminals respectively in accordance with the state of said devices,
first and second AND gates associated with each bistable device and having their outputs coupled to said first and second input terminals thereof respectively,
said first AND gates each receiving as inputs said first signal and said voltage on said first output terminal of another bistable device,
said second AND gates each receiving as inputs said second signal and said voltage on said second output terminal of another bistable device,
means for inhibiting said bistable devices from all assuming the same state simultaneously including one of said first AND gates receiving as an input the voltage on the second output terminal of still another bistable device and the second AND gate associated with the same bistable device as said one first AND gate receiving as in input the voltage on the first output terminal of said still another bistable device,
a source of direct current, and
output transformer means having N phases each of which includes a primary winding having a midtap connected to said direct current source and the opposite ends thereof coupled to said first and second output terminals of one of said bistable devices and a main secondary winding and first and second compensating secondary windings inductively linked with said primary winding, the main secondary winding for each said phase being connected in series with the first compensating winding of another phase and with the second compensating winding of still another phase.

6. In a static inverter in accordance with claim 5 wherein N is three and said main secondary windings of all of said phase are connected in star and said first and second auxiliary windings in series with each of said main secondary windings are reversed in polarity relative to said main secondary winding.

7. In a static inverter in accordance with claim 4 wherein said another phase leads and said still another phase lags said phase by 120° and said first and second auxiliary secondary windings have half the number of turns as said main secondary winding.

8. In a static inverter in accordance with claim 5 and including diode means for coupling said output terminals of said bistable devices to said AND gates, whereby RC time delays are eliminated and the frequency of said inverter changes proportionally with changes in the frequency of said periodic signal source.

9. In a static inverter,
a source of periodic signals providing first and second signals alternately,
N bistable devices having first and second input terminals and switching between states in response to signals appearing thereon and also having first and second output terminals and providing voltage on said first and second output terminals respectively in accordance with the state of said devices,
first and second AND gates associated with each bistable device and having their outputs coupled to said first and second input terminals thereof respectively;
said first AND gates each receiving as inputs said first signals and said voltage on said first output terminal of another bistable device,
said second AND gates each receiving as inputs said second signal and said voltage on said second output terminal of another bistable device,
means for inhibiting said bistable devices from all assuming the same state simultaneously including one of said first AND gates receiving as an input the voltage on the second output terminal of still another bistable device and the second AND gate associated with the same bistable device as said one first AND gate receiving as an input the voltage on the first output terminal of said still another bistable device,
a source of direct current,
output transformer means having N primary windings each having a midtap connected to said direct current source and the opposite ends thereof coupled to said first and second output terminals of one of said bistable devices,
each said bistable device being coupled to said primary winding through a pair of power transistors, and
bias deriving secondary winding means on said output transformer means for biasing said power transistors so that they operate near the region of saturation and vary the amount of bias as a function of the magnitude of the current through said primary winding, whereby said power transistors continue to operate near saturation regardless in variations in load current.

10. In a static inverter in accordance with claim 9 wherein said output terminals of said bistable device are coupled to the bases of said power transistors and said means for biasing varies the base drive on said power transistors as a function of the current carried by said primary winding.

11. In a static inverter in accordance with claim 10 and including a preamplifier transistor stage between said bistable device and said pair of power transistors, and wherein said means for biasing includes diodes between said biasing deriving secondary winding and one electrode of the transistors of said preamplifier stage.

12. In a static inverter,
a source of periodic signals providing first and second signals alternately,
N bistable devices having first and second input terminals and switching between states in response to signals appearing thereon and also having first and second output terminals and providing voltage on said first and second output terminals respectively in accordance with the state of said devices,
first and second AND gates associated with each bistable device and having their outputs coupled to said first and second input terminals thereof respectively;
said first AND gates each receiving as inputs said first signal and said voltage on said first output terminal of another bistable device,
said second AND gates each receiving as inputs said second signal and said voltage on said second output terminal of another bistable device, and
means for inhibiting said bistable devices from all assuming the same state simultaneously including one of said first AND gates receiving as an input the voltage on the second output terminal of still another bistable device and the second AND gate associated with the same bistable device as said one first AND gate receiving as an input the voltage on the first output terminal of said still another bistable device,
a source of direct current,
output transformer means having N primary windings each having a midtap connected to said direct current source and the opposite ends thereof coupled to said first and second output terminals of one of said bistable devices, said first and second output terminals of said bistable devices being coupled to said ends of said primary winding through first and second power transistors in a push-pull arrangement, first and second diodes connected to bypass reverse currents past said first and second power transistors respectively, and
rectifying means connected across said primary winding for continuously forward biasing said first and second diodes.

13. In a static inverter,
a source of periodic signals providing first and second signals alternately,
N bistable devices having first and second input terminals and switching between states in response to signals appearing thereon and also having first and second output terminals and providing voltage on said first and second output terminals respectively in accordance with the state of said devices,
first and second AND gates associated with each bistable device and having their outputs coupled to said first and second input terminals thereof respectively;
said first AND gates each receiving as inputs said first signal and said voltage on said first output terminal of another bistable device,
said second AND gates each receiving as inputs said second signal and said voltage on said second output terminal of another bistable device, and
means for inhibiting said bistable devices from all assuming the same state simultaneously including one of said first AND gates receiving as an input the voltage on the second output terminal of still another bistable device and the second AND gate associated with the same bistable device as said one first AND gate receiving as an input the voltage on the first output terminal of said still another bistable device,
a source of direct current,
output transformer means having N primary windings each having a midtap connected to said direct current source and the opposite ends thereof coupled to said first and second output terminals of one of said bistable devices,
said first and second output terminals of said bistable device being coupled to said ends of said primary winding through the base-collector circuit of first and second power transistors in a push-pull arrangement having their emitters coupled to ground, and
inductance means between the emitter and ground of each of said power transistors for reducing the magnitude of transient current which tend to maintain said power transistor conducting when it is switched off.

14. In a static inverter for converting direct current into polyphase alternating current, the combination of:
a source of direct current,
output transformer means having three primary windings with midtaps connected to said direct current source, a source of periodic signals, three bistable devices each having first and second input terminals and switching between states in response to signals appearing thereon and also having first and second output terminals coupled to opposite sides of one of said primary windings in push-pull, logic control means including first and second AND gates associated with each bistable device and having their outputs coupled to said first and second input terminals thereof respectively and each receiving as inputs a feedback signal from one of said output terminals of another of said bistable devices and a signal from said source of periodic signals for switching said bistable devices in a predetermined sequence and including means for inhibiting said bistable devices from all transferring to the same state simultaneously comprising a first feedback signal to each of said AND gates associated with one of said bistable devices being from said first output terminal of another of said bistable devices and a second feedback signal thereto being from said second output terminal of still another bistable device, and wherein said output transformer means has three star connected phases each of which is energized by one of said primary windings and includes a main secondary winding and compensating secondary winding means inductively linked with said primary windings of the other phases and in series with said main secondary winding for shaping the phase to neutral voltage induced in said main secondary winding so that the sum of the instantaneous phase-to-neutral voltages of said three phases is zero.

15. In a static inverter for converting direct current into polyphase alternating current, the combination of:

a source of direct current, output transformer means having three primary windings with midtaps connected to said direct current source, a source of periodic signals, three bistable devices each having first and second input terminals and switching between states in response to signals appearing thereon and also having first and second output terminals coupled to opposite sides of one of said primary windings in push-pull, logic control means including first and second AND gates associated with each bistable device and having their outputs coupled to said first and second input terminals thereof respectively and each receiving as inputs a feedback signal from one of said output terminals of another of said bistable devices and a signals from said source of periodic signals for switching said bistable devices in a predetermined sequence and including means for inhibiting said bistable devices from all transferring to the same state simultaneously comprising a first feedback signal to each of said AND gates associated with one of said bistable devices being from said first output terminal of another of said bistable devices and a second feedback signal thereto being from said second output terminal of still another bistable device, and wherein said output transformer means has three phases each of which includes one of said primary windings, a main secondary winding and first and second compensating secondary windings inductively linked with said primary winding, said main secondary winding of each phase being connected in series with the first compensating winding of another phase which leads said phase by 120° and the second secondary compensating winding of still another phase which lags said phase by 120° and said first and second compensating windings having approximately half the number of turns and being reversed in polarity from the main secondary winding with which they are in series.

References Cited

UNITED STATES PATENTS

| | | | |
|---|---|---|---|
| 3,200,321 | 8/1965 | Rosenstein | 321—3 |
| 3,257,601 | 6/1966 | Bizouard et al. | 321—5 |
| 3,324,374 | 6/1967 | Corey | 321—5 |
| 3,374,414 | 3/1968 | Garnett | 321—5 |
| 3,401,326 | 9/1968 | Hunter | 321—5 |
| 3,453,524 | 7/1969 | Dinger | 318—227X |

FOREIGN PATENTS

| | | | |
|---|---|---|---|
| 1,018,027 | 1/1966 | Great Britain | 321—SW(UX) |

WILLIAM H. BEHA, JR., Primary Examiner

U.S. Cl. X.R.

307—223; 321—9

PO-1050
(5/69)

UNITED STATES PATENT OFFICE
CERTIFICATE OF CORRECTION

Patent No. __3,566,244__      Dated __February 23, 1971__

Inventor(s) __John Baude__

It is certified that error appears in the above-identified patent and that said Letters Patent are hereby corrected as shown below:

Column 12, line 20, "emitters" should be ---emitter---;

line 66, "phase" should be ---phases---;

line 67, "second auxiliary windings" should be ---second auxiliary secondary windings---.

Signed and sealed this 29th day of June 1971.

(SEAL)
Attest:

EDWARD M. FLETCHER, JR.
Attesting Officer

WILLIAM E. SCHUYLER, JR.
Commissioner of Patents